(12) United States Patent
Stanley et al.

(10) Patent No.: US 8,961,788 B2
(45) Date of Patent: Feb. 24, 2015

(54) SHOWER FILTER

(75) Inventors: Ronald E. Stanley, New Smyrna Beach, FL (US); Richie E. Stanley, New Smyrna, FL (US); Chad C. Galloway, New Smyrna, FL (US)

(73) Assignee: Enviro Water Solutions, Inc., Deland, FL (US)

( * ) Notice: Subject to any disclaimer, the term of this patent is extended or adjusted under 35 U.S.C. 154(b) by 315 days.

(21) Appl. No.: 13/523,162

(22) Filed: Jun. 14, 2012

(65) Prior Publication Data

US 2013/0334116 A1 Dec. 19, 2013

(51) Int. Cl.
*B01D 35/04* (2006.01)

(52) U.S. Cl.
CPC ...................................... *B01D 35/04* (2013.01)
USPC ........... 210/282; 210/283; 210/288; 210/289; 210/251; 210/439; 210/443

(58) Field of Classification Search
CPC . B05B 1/18; C02F 2201/006; C02F 2307/06; B01D 27/02; B01D 27/146; B01D 24/007; B01D 24/12; B01D 35/04
USPC ......... 210/282, 283, 288, 289, 293, 251, 439, 210/443
See application file for complete search history.

(56) References Cited

U.S. PATENT DOCUMENTS

| | | | | | |
|---|---|---|---|---|---|
| 3,266,628 | A | * | 8/1966 | Price | 210/94 |
| 4,504,389 | A | * | 3/1985 | Rundzaitis | 210/266 |
| 4,770,768 | A | * | 9/1988 | Lang | 210/94 |
| 7,427,352 | B2 | * | 9/2008 | Naito | 210/223 |
| 7,611,070 | B2 | * | 11/2009 | Paoluccio | 239/9 |
| 2006/0266691 | A1 | * | 11/2006 | Cheng | 210/266 |

* cited by examiner

*Primary Examiner* — Matthew O Savage
(74) *Attorney, Agent, or Firm* — Wood, Phillips, Katz, Clark & Mortimer

(57) ABSTRACT

A shower filter between a downwardly slanting shower arm and a shower head, including a base, and a vertical housing with filler material. The base has an input chamber for receiving water from the shower arm, and an output chamber from which water may be discharged to the shower head. The housing is secured at its bottom end to the base and has a first port communicating with the base input chamber and a second port communicating with the base output chamber. A tube carries water from the housing first port to the top end of the housing, where it is diffused before passing down through the filter material and second port to the output chamber. A fragrant block is mounted to the base.

23 Claims, 10 Drawing Sheets

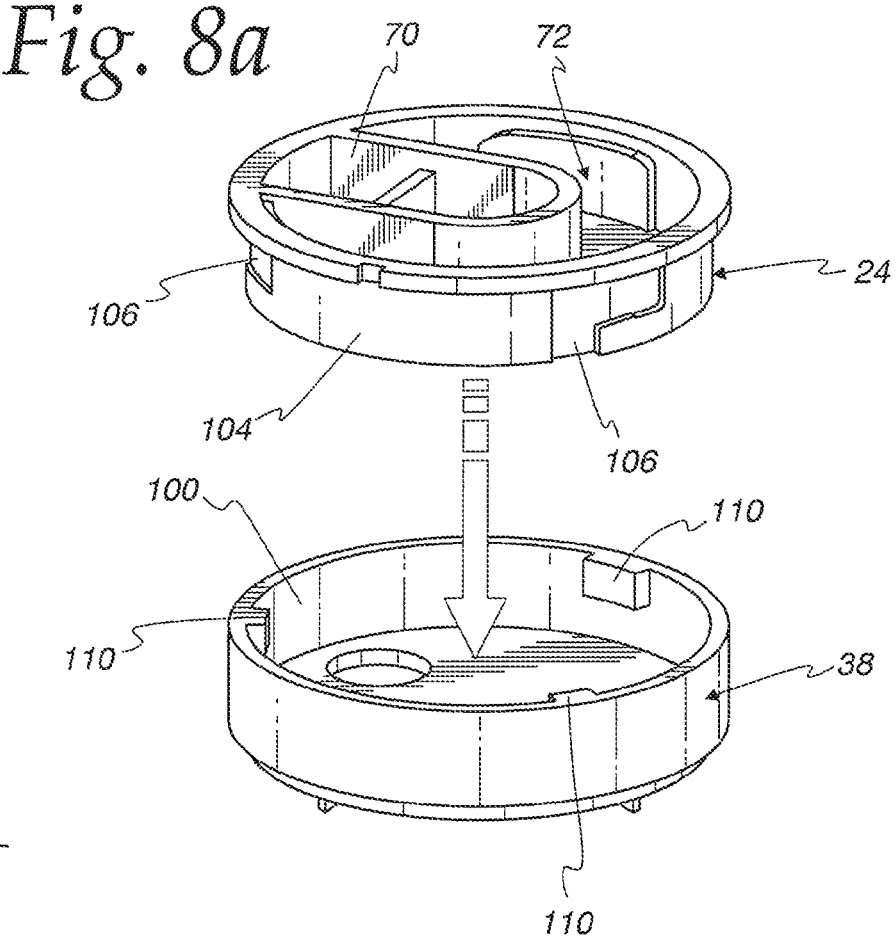
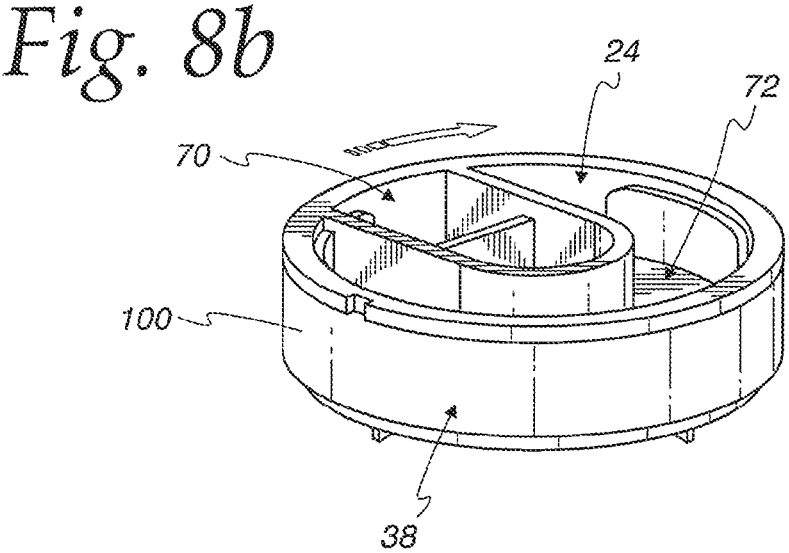

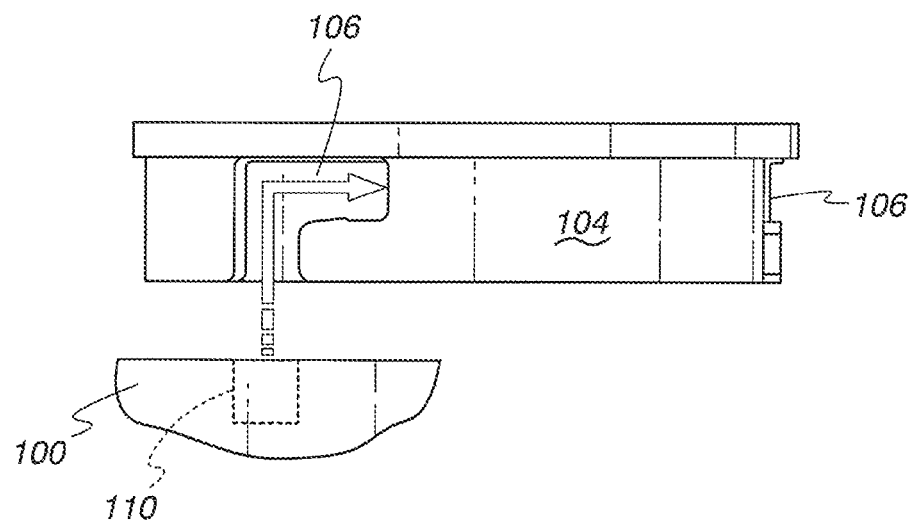
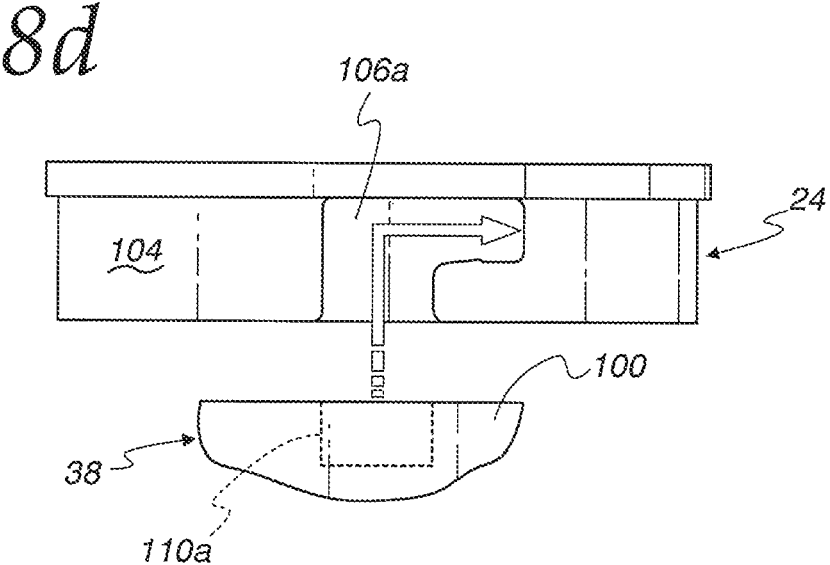

SHOWER FILTER

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to water filters, and more particularly to water filters for showers.

BACKGROUND OF THE INVENTION

Showers for use by individuals to wash off are present in virtually every home in the United States, and are similarly widely found in many countries throughout the world. Such showers are also prevalent in many institutional facilities where people live and/or play, including hotels and health clubs.

Understandably, the water quality may vary widely between such facilities. Further, since many people find themselves showering in many difficult locations (such a travelers in many different hotel rooms) where they cannot readily know the water quality, it is important not only for water quality in the shower but also for peace of mind of the person showering that the water be filtered.

However, providing suitable filtering in so many locations, where the filter must in many instances fit in existing facilities which were built without intending to have filters, all the while providing reliable filtering over long periods of time (as long as the existing facility exists) is a daunting task.

SUMMARY OF THE INVENTION

According to one aspect of the present invention, a shower filter is provided between a downwardly slanting shower arm and a shower head, including a base, a generally vertical housing secured at its bottom end to the base, filter material in the housing, and a tube. The base includes an input with an input connector securable to the shower arm and defining an input chamber for receiving water from the shower arm, and an output with an output connector securable to the shower head and defining an output chamber for discharging water to the shower head. The housing is secured at its bottom end to the base and has a first port communicating with the base input chamber and a second port communicating with the base output chamber. The tube is connected on one end to the housing first port and open on its other end adjacent to the top end of the housing whereby water from the input chamber is carried through the tube to the top end of the housing and then passes down through the filter material to the output chamber through the second port.

In one form of this aspect of the present invention, a top diffuser is located in the housing between the housing top end and the filter material, wherein the tube extends through the diffuser. In a further form, the top diffuser includes a screen, and in a still further form, a bottom diffuser is at a cap at the bottom of the housing.

In another form of this aspect of the present invention, a twist connection is between the housing and the base whereby the housing may be released from the base by twisting the housing relative to the base.

In still another form of this aspect of the present invention, the base includes first and second sections sealed together so that passage of water directly between the input and output chambers is prevented. The first section has the base input and the base output and defines a generally upwardly open first part of the input chamber and a generally upwardly open first part of the output chamber. The second section defines a generally downwardly open second part of the input chamber and a generally downwardly open second part of the output chamber, wherein the second section also includes an outlet opening from the input chamber communicating with the housing first port, and an inlet opening to the output chamber communicating with the housing second port.

In further forms of the above form of this aspect of the invention, the bottom of the housing is a cap having openings through substantially opposite sides comprising the first and second ports, and the first port is aligned with the input chamber outlet opening and the second port is aligned with the output chamber inlet opening. In a still further form, the cap on its upper side facing the housing top end includes vanes for directing water toward the second port and, in still further forms, a lip extends from the cap upper side to define a boundary of a housing exit chamber around the vanes and the second port with a screen overlying the lip and vanes and defining an upper side of the housing exit chamber. In yet further forms, the filter material comprises vertically discrete sections of at least two of felt, foam and carbon, and in still further forms, the filter sections include notches through which the tube extends, or the cap is fixed to the housing and seals the filter material in the housing. In still further forms, the filter section adjacent the housing cap is infrared ceramic balls, and further the vanes may extend upwardly from the cap with the ceramic ball filter section sitting atop the vanes.

In yet another form of this aspect of the present invention, a twist connection is between the housing and the base whereby the housing may be released from the base by twisting the housing relative to the base. In a further form, the housing is generally cylindrical along its height but further including flat portions on opposite sides of the housing above the twist connection.

Yet another form of this aspect of the present invention includes a mount on the base adjacent the base output, and a removable fragrant insert secured to the mount.

In another aspect of the present invention, a shower filter is provided between a downwardly slanting shower arm and a shower head, including a base, a generally vertical housing secured at its bottom end to the base, filter in the housing, and a tube. The base includes an input with an input connector securable to the shower arm and defining an input chamber for receiving water from the shower arm, and an output with an output connector securable to the shower head and defining an output chamber for discharging water to the shower head. The base also includes first and second sections sealed together so that passage of water directly between the input and output chambers is prevented. The first section has the base input and the base output and defines a generally upwardly open first part of the input chamber and a generally upwardly open first part of the output chamber. The second section defines a generally downwardly open second part of the input chamber and a generally downwardly open second part of the output chamber, wherein the second section also includes an outlet opening from the input chamber communicating with the housing first port, and an inlet opening to the output chamber communicating with the housing second port. The housing includes a cap closing its bottom end and is secured at its bottom end to the base and has first and second ports through the cap with the first port communicating with the base input chamber and the second port communicating with the base output chamber. The filter includes a filter material in the housing including vertically discrete sections of at least three of felt, foam, carbon, and infrared ceramic balls, a top diffuser in the housing between the housing top end and the filter material, and a bottom diffuser at a cap at the bottom of the housing. The tube is connected on one end to the housing first port and open on its other end adjacent to the top end of the housing and extending through the top filter material and top diffuser whereby water from the input chamber is carried through the tube to the top end of the housing and then passes down through the filter material to the output chamber through the second port.

In one form of this aspect of the present invention, the cap on its upper side facing the housing top end includes vanes for directing water toward the second port, and a lip extends from the cap upper side to define a boundary of a housing exit chamber around the vanes and the second port, and the bottom diffuser is a screen overlying the lip and vanes and defining an upper side of the housing exit chamber.

In another form of this aspect of the present invention, a twist connection is between the housing and the base whereby the housing may be released from the base by twisting the housing relative to the base. In still another form of this aspect of the invention, a mount is on the base adjacent the base output, and a removable fragrant insert secured to the mount.

In still another aspect of the present invention, a shower head accessory is provided between a shower arm and a shower head, including a housing with an input for water from a shower arm and an output for water at a shower head. The housing has water filters therein wherein water from the input is directed through the water filters before leaving the exit to the shower head. A mount is on the exterior of the housing adjacent the housing exit, and a removable fragrant insert is secured to the mount.

In one form of this aspect of the present invention, the mount includes vents on a side facing away from the housing.

In another form of this aspect of the present invention, a hook is on the mount adjacent the vents.

Other objects, features, and advantages of the invention will become apparent from a review of the entire specification, including the appended claims and drawings.

BRIEF DESCRIPTION OF THE DRAWINGS

FIGS. 8a-8d are perspective views illustrating the manner of connecting the base portion upper section and the housing cap;

FIG. 9b is a perspective view of a fragrant block which may be used with the mount of FIG. 9a.

DETAILED DESCRIPTION OF THE PREFERRED EMBODIMENT

Figure 1:
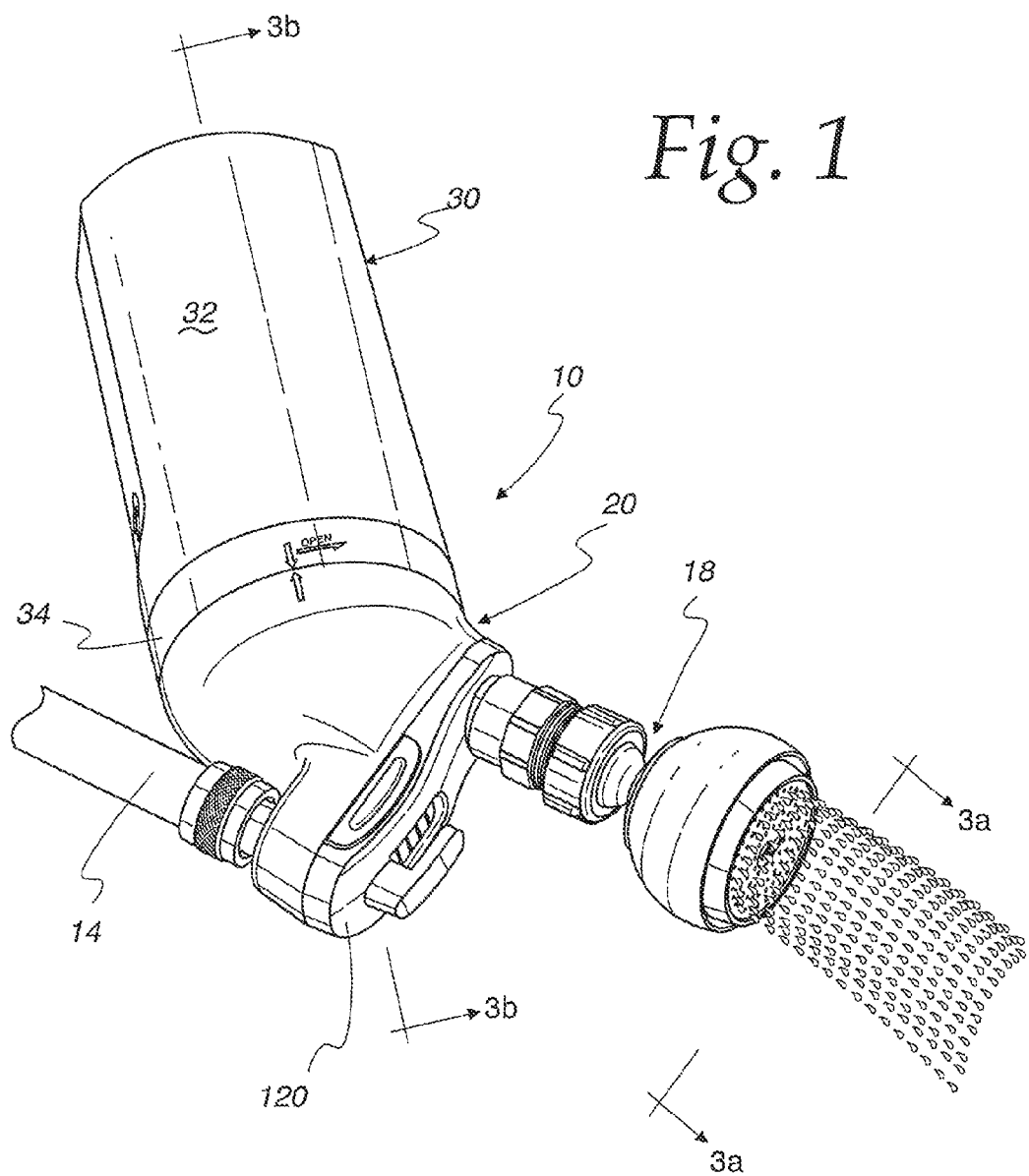
FIG. 1 is a perspective view of a shower water supply with the shower filter of the present invention between the shower arm and the shower head.
Figure 2:
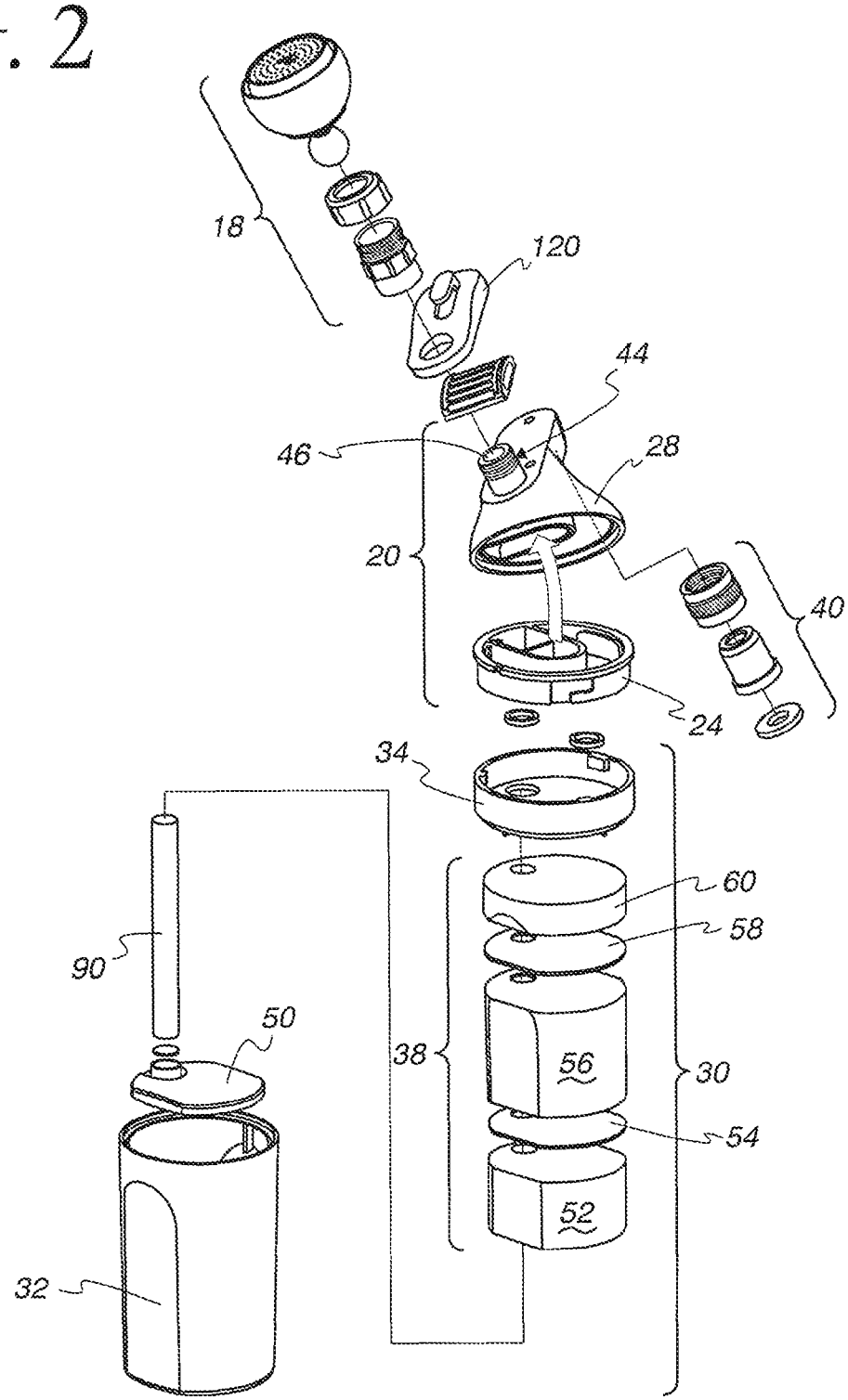
FIG. 2 is an exploded view of the shower water supply of FIG. 1.

A shower filter 10 according to the invention is shown in detail in the Figures, with the full assembly shown particularly in FIGS. 1-2.

As illustrated in FIG. 1, the shower filter 10 may be installed between a shower arm 14 and a shower head 18. The shower arm 14 slants downwardly and may be of a conventional design such that the shower filter 10 may be used in existing showers. The shower head 18 may be of any design which may be suitably used with the design of the shower arm 14.

As illustrated in FIG. 2, the shower head 10 includes a base portion 20 made of upper and lower sections 24, 28 (the assembly in FIG. 2 is upside down from the normal installation), and a housing portion 30 including a housing or case 32 with a cap 34 which closes filter material 38 in the housing 32.

The base portion 20, which is described in further detail below with reference to FIGS. 5a, 5b, 6a, 6b, includes an input 40 with a suitable input connector (typically a threaded coupling with, e.g., a coupling lug) for connecting to an exterior thread on the shower arm 14), and an output 44 with a suitable connector 46 (e.g., an outer thread) for connecting to a shower head 18.

As illustrated in FIG. 1, it can be appreciated that the offset of the input 40 and output 46 combined with the tilt of the base 20 allow the filter 10 to be included in a shower without causing the shower filter 10 to undesirably lower the height of the shower head 18.

Figure 3A:
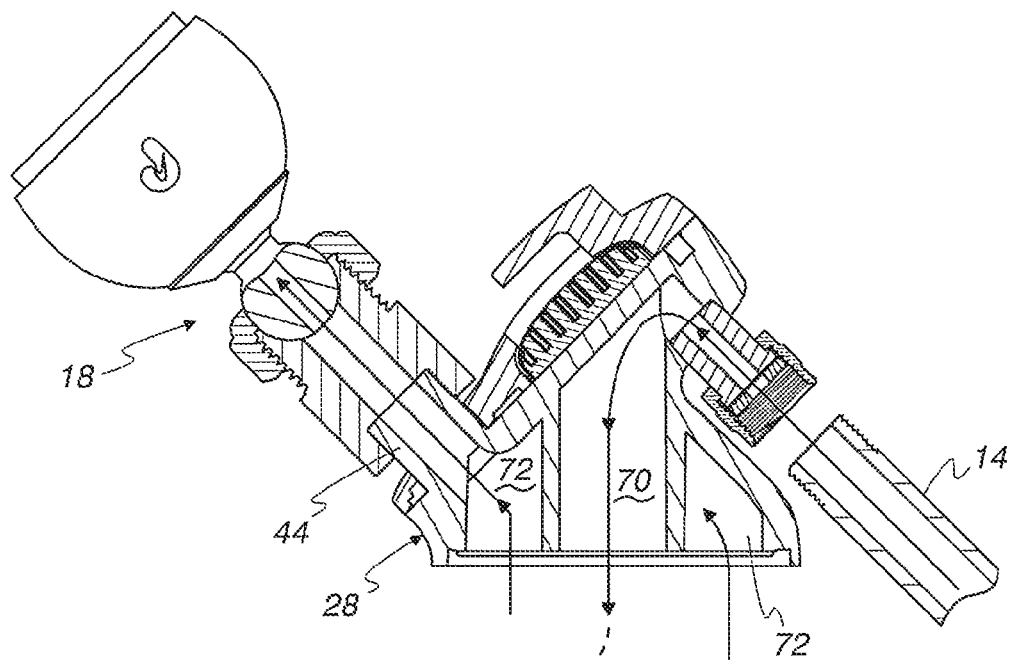
FIG. 3a is a cross-sectional view taken along line 3a-3a of FIG. 1, showing the lower section of the base of the shower filter of FIGS. 1-2 mounted between the shower arm and the shower head.
Figure 3B:
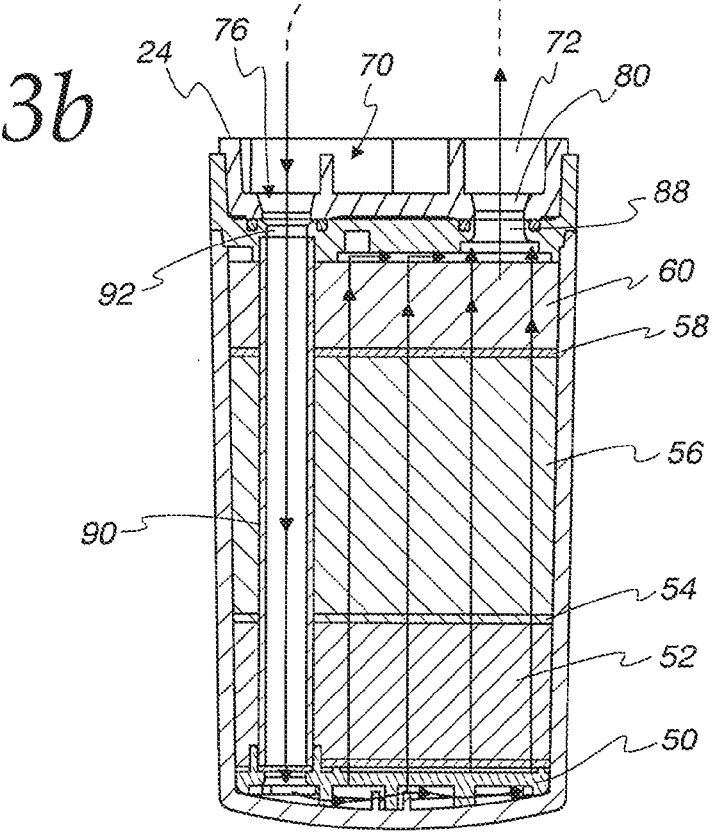
FIG. 3b is a cross-sectional view taken along line 3b-3b of FIG. 1 showing the upper section of the base of the shower filter connected to the removable housing and shower filter material of the shower filter of FIGS. 1-2.

The filter material 38 may advantageously include a plurality of discrete filter sections. For example, as illustrated the filter material 38 advantageously includes a suitable diffuser assembly 50 at its top (the top being the bottom in the inverted orientation of FIGS. 2 and 3b), then KDF-55 filter media 52 (zinc/copper mesh filter media), below which is a felt filter 54 that acts as a sediment filter and media separator. Below the felt filter 54 is a GAC carbon media 56, followed by a foam layer 58 and then infrared ceramic balls 60 which help to give the water a feel of softness. The cap 38 may be sonic welded to the housing 32 to secure the filter material 38 in the housing.

Figure 4A:
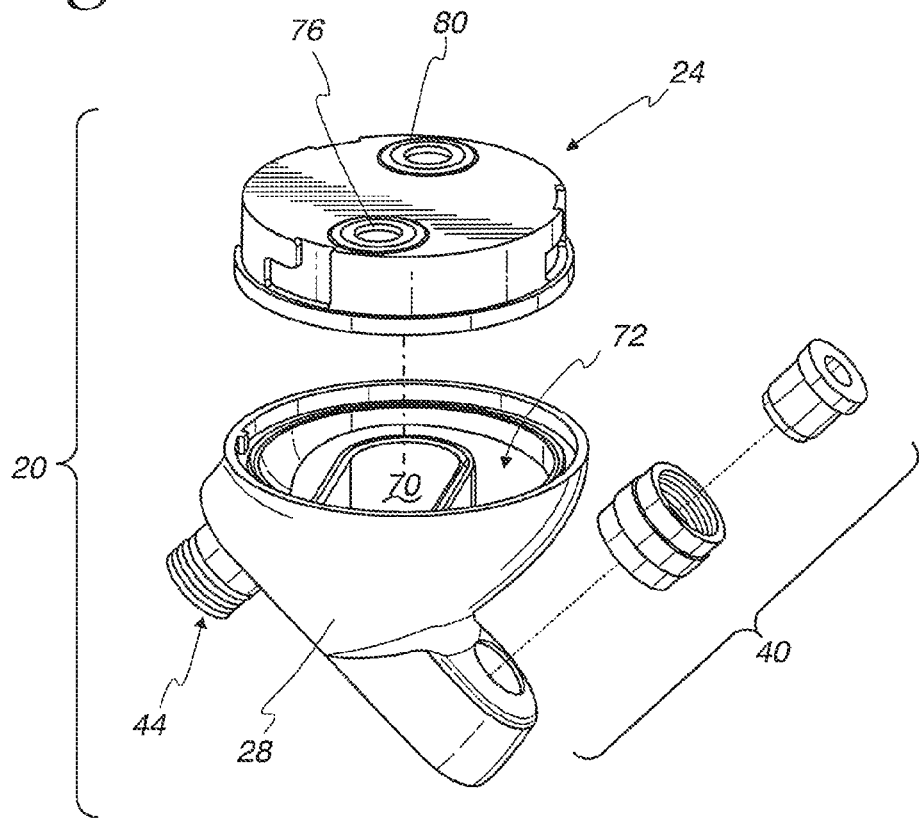
FIGS. 4a and 4b are exploded and assembled perspective views of the shower filter base portion.
Figure 4B:
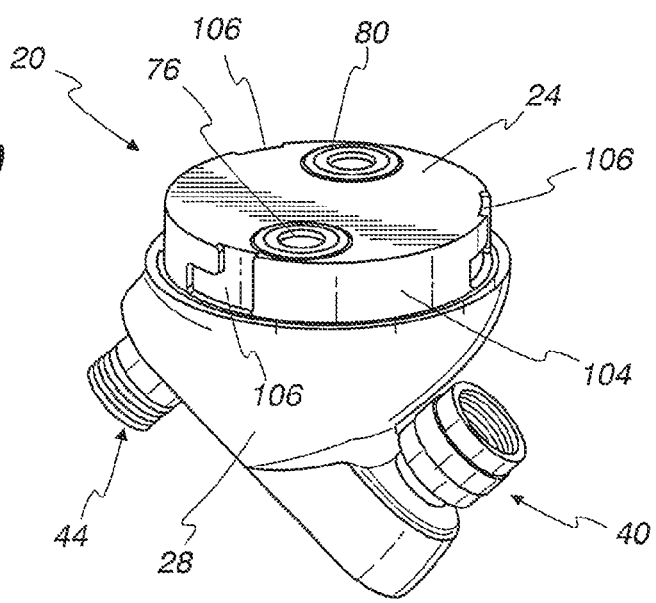
Figure 5A:
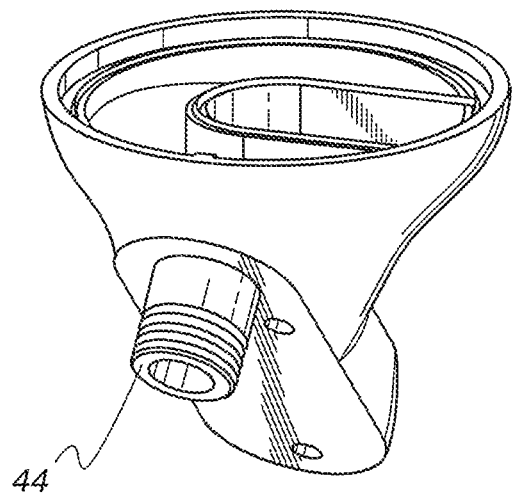
FIGS. 5a and 5b are perspective views of the lower section of the base portion.
Figure 5B:
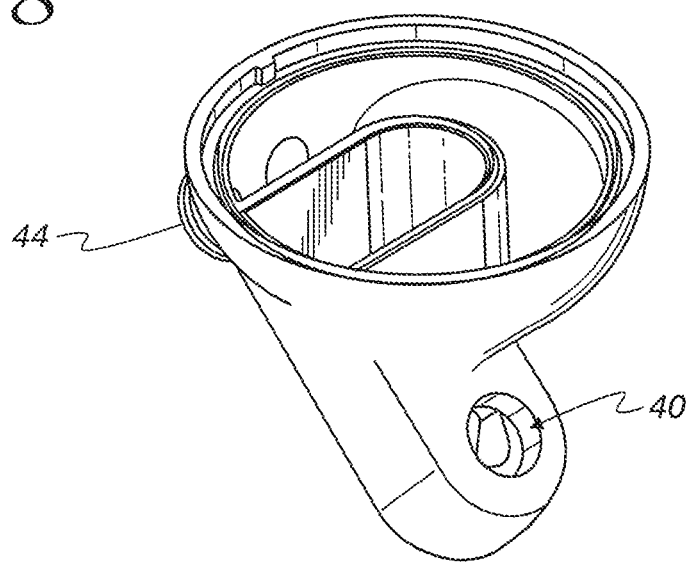

The base portion 20 is also shown in detail in FIGS. 4a and 4b, with the base portion lower section 28 further illustrated in FIGS. 5a and 5b. Specifically, as illustrated in FIGS. 4a and 4b, the base portion 20 defines input and output chambers 70, 72 which are suitably sealed (e.g., by sonic welding of the upper and lower sections 24, 28) so as to not only prevent water from leaking out of the base portion 20, but also to completely separate water from the input and output chambers. More specifically, when the sections 24, 28 are sealed together as in FIG. 4b, water from the shower arm 14 will pass into the input chamber 70 and from there flow to an exit port 76 through the base portion upper section 24. Water will reach the output chamber 70 only after exiting the base portion 20, passing through the filter material 38, and then through the inlet port 80. The water in the outlet chamber 72 (which is generally around the inlet chamber 70) is thus filtered, with that filtered water then flowing out through the shower head 18 (see FIG. 3a).

Figure 6A:
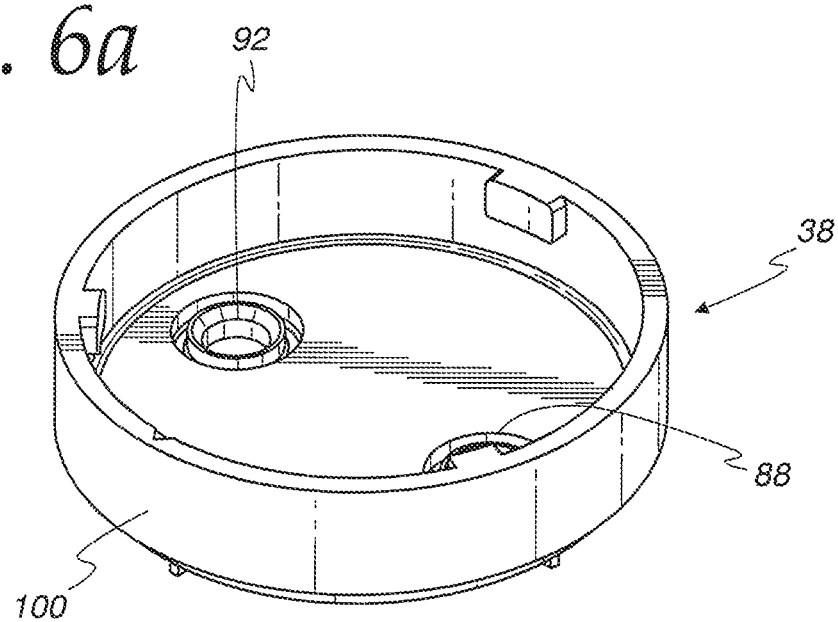
FIGS. 6a and 6b are perspective views of the housing cap, with FIG. 6a showing the bottom of the cap and FIG. 6b showing the top of the cap.
Figure 6B:
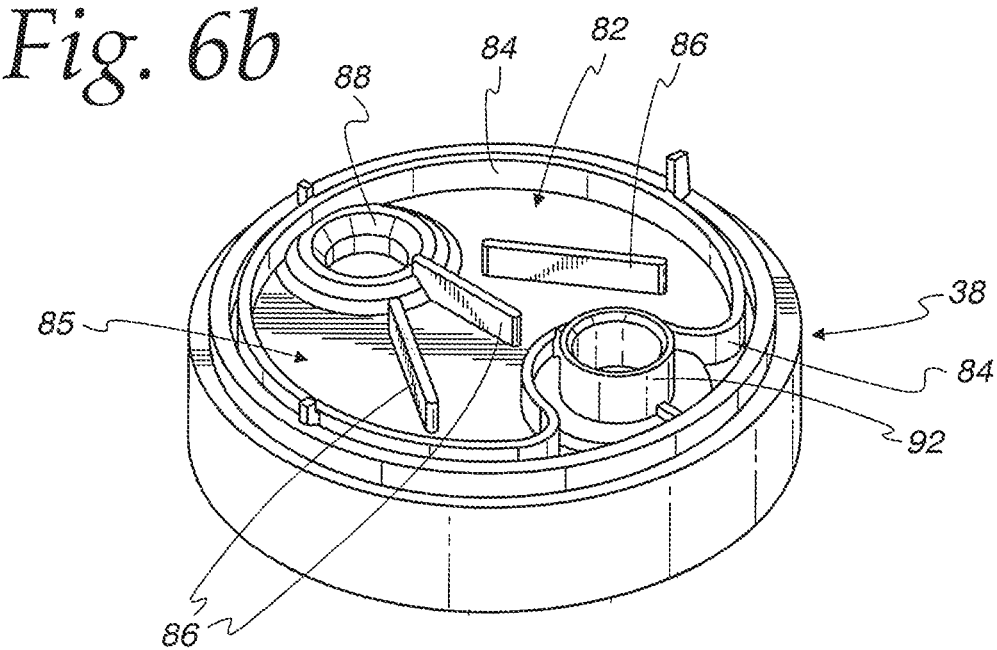

The cap 38 of the housing portion 30 is illustrated in detail in FIGS. 6a and 6b. Specifically, the cap top surface 82 (see FIG. 6b) which faces into the housing portion 30) has a lip 84 extending upwardly to define a boundary of an exit chamber 85 in the housing portion 30 around vanes 86 and the exit port 88 through the cap 38. The bottom of the filter material 38 (e.g., the infrared ceramic balls 60) may overlie (and define an upper side of) the housing exit chamber 85, whereby water which has passed down through all of the filter material 38 may flow through the filter material 38 and into the exit chamber 85, where the vanes 86 serve not only to partially support the bottom of the filter material 38 but also to direct the water to the exit port 88.

Figure 7A:
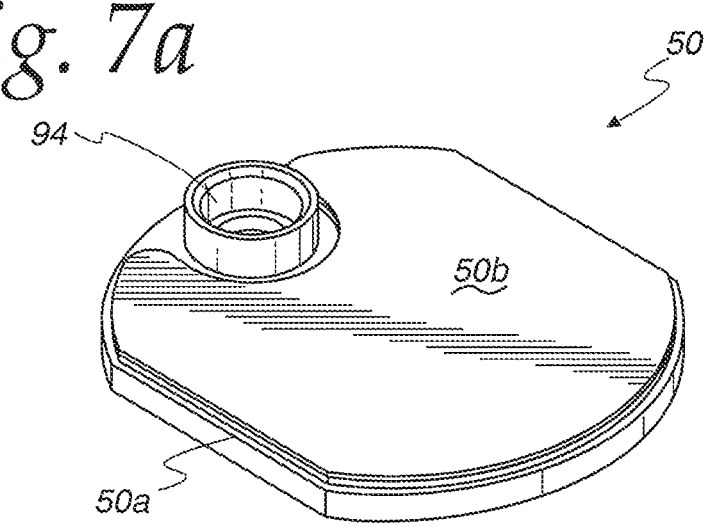
FIGS. 7a and 7b are exploded and assembled perspective views of the diffuser assembly of the housing portion.
Figure 7B:
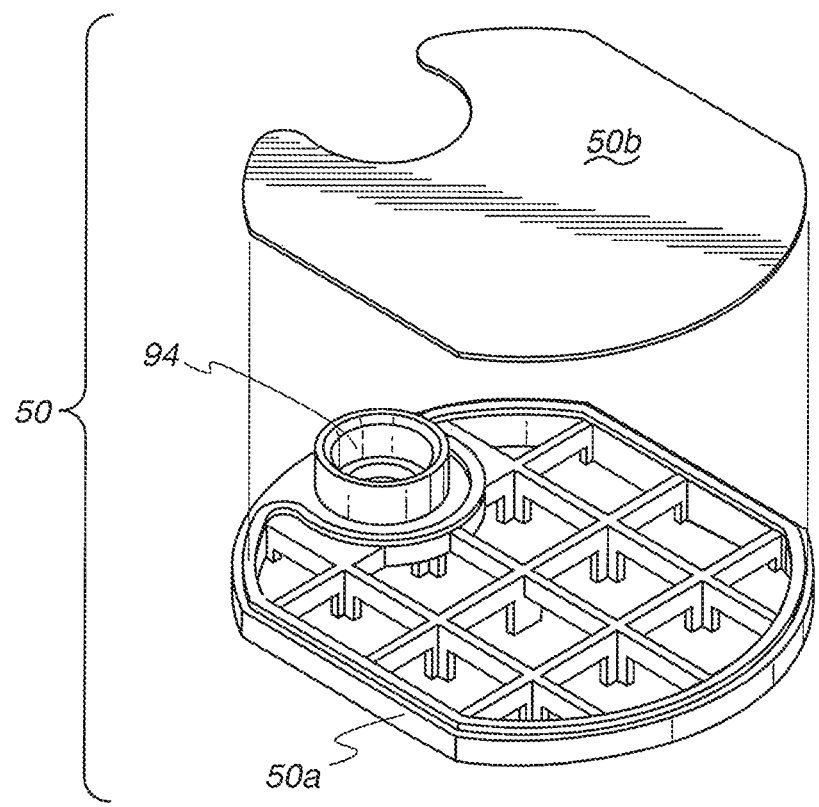

A tube 90 extends from the bottom to the top of the housing portion 20, with its lower end sealed to an inlet port 92 in the cap 38 and its upper end sealed to an outlet port 94 in the diffuser assembly 50. As seen in FIGS. 7a and 7b, the diffuser assembly 50 may advantageously include a supporting grid structure 50a which provides a stable outlet port 94 and also supports a suitable screen 50b thereon. (Note that for convenience of drawing, the openings in the screen 50b and other sections of filter material 38 are not shown in the drawings but it should be understood that the structures are such that water may pass therethrough.) Between the ports 92, 94 at either end, the tube 90 extends through aligned openings in the filter material 38 (see FIGS. 2 and 3b), whereby all the water from the shower arm 14 is carried by the tube 90 to the top of the housing portion 30. From there, the water will be dispersed by the dispersing assembly 50 and then flow down through the filter material 38 where it will at the bottom flow through the exit chamber 85 (see FIG. 6b) and then out the exit port 88.

The housing portion 30 is advantageously removably secured to the base portion 20 to facilitate easy replacement of filter material 38. Specifically, with the filter material 38 sealed inside the housing 32 by the cap 38 secured to the open end of the housing 32, the entire housing portion may be removed and replaced with a new housing portion 20 and filter material 38. Specifically, as illustrated in FIGS. 8a-8d, the housing cap 38 includes a cylindrical rim 100 sized to generally fit around the generally cylindrical base portion upper section 24. The outer surface 104 of the base portion upper section 24 includes L-shaped notches 106 spaced around the surface (see FIGS. 4a and 4b), and tabs 110 project radially inwardly from the cap rim 100 (see FIG. 6a). Assembly of the housing portion 30 to the base portion 20 may thus be easily accomplished by first lowering the housing portion 30 down over the base portion upper section 24 with the tabs 110 sliding down the vertical legs of the notches 106 and then twisting the housing portion 30 so that the notches slide over into the feet of the notches 106 to provide an interference fit so that the housing portion 30 would cannot be pulled up and off the base portion 20. Similarly, removal of the housing portion 30 for repair or replacement may then be as easily accomplished by first twisting the housing portion 30 and then pulling it up.

In the illustrated embodiment, three notches 106 and tabs 110 are provided. This is advantageous not only in providing a secure attachment while also allowing easy removal, but the use of three notches 106 and tabs 110 also enables the housing portion 30 to be reliable oriented as required for proper operation—that is, with the base portion upper section exit port 76 aligned with the housing cap inlet port 92 and the housing cap outlet port 88 aligned with the base portion upper section inlet port 80. Moreover, as illustrated by FIGS. 8c and 8d, one set of notches 106a and tabs 110a may be larger than the others, so that the housing portion 30 and base portion 20 may be secured together in only one—the proper—orientation.

Figure 9A:
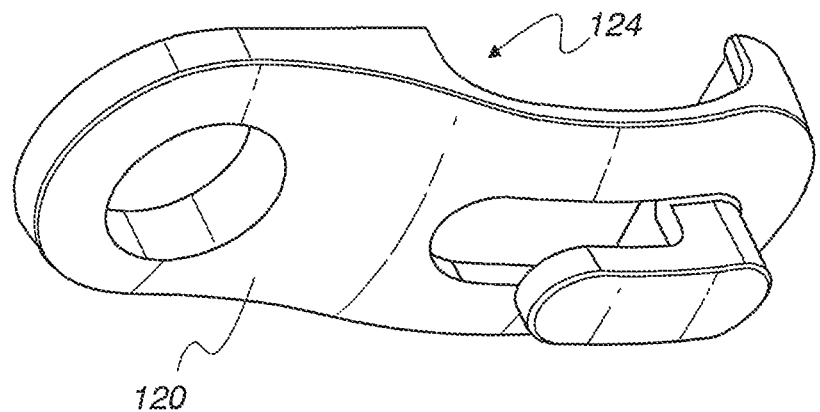
FIG. 9a is a perspective view of a base portion mount.
Figure 9B:
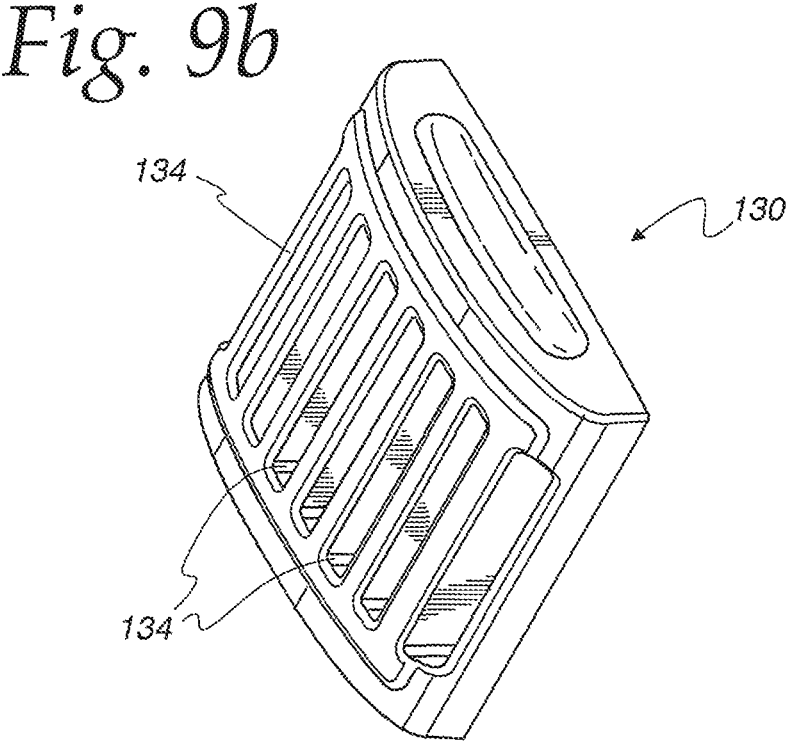

The shower filter 10 may also advantageously include a mount 120 (see FIGS. 1, 2 and 9a) on the exterior bottom of the base portion 20, adjacent the base portion output 44. The mount 120 includes a recess 124 in which a fragrant insert or block 130 may be removably secured. The fragrant insert 130 may be of any suitable design, including for example an insert 130 made of HDPE resin and including vents 134 which allow for steam from the shower to help release scent infused into the insert 130. It should be appreciated that the close proximity which the configuration of the shower filter 10 provides of the insert 130 to the shower head 18 where hot water is released is particularly advantageous. Moreover, by locating the insert 130 directly against the base portion 20 through which hot water is flowing during a shower still further facilitate release of the insert scent.

It should thus be appreciated that water from the shower arm 14 will enter the base portion 20 and pass through the base portion input chamber 70 to its exit port 76. The water will pass through the base portion upper section exit port 76 and the aligned housing cap inlet port 92 (which may be, e.g., advantageously compression sealed to prevent leaking between the ports) and then through the tube 90 to the upper end of the housing 32. Water in the upper end of the housing 32 is then diffused by the diffuser assembly 50 before passing down through the filter material 38 and into the housing exit chamber 85, through which it is directed to the housing cap outlet port 88 and the aligned base portion upper section inlet port 80 (which also may be advantageously compression sealed to prevent leaking between the ports). Water passing through the base portion upper section inlet port 80 then passes through the base portion output chamber 72 to the base portion output 44 and then out through the shower head 18, which is supported at a desirable height notwithstanding the downward slant of the shower arm 14 and shower head 18 and the inserted shower filter 10. Further, as previously noted, the water advantageously exits adjacent the fragrant insert 130.

It should be appreciated that the present invention may be conveniently and advantageously used in virtually any shower to enhance the shower experience.

The invention claimed is:

1. A shower filter for connection between a downwardly slanting shower arm and a shower head comprising:
   a base having
      an input with an input connector securable to said shower arm and defining an input chamber for receiving water from said shower arm, and
      an output with an output connector securable to said shower head and defining an output chamber for discharging water to said shower head;
   a generally vertical housing having a cap at its bottom end secured to said base, said housing having a first port communicating with said base input chamber and a second port communicating with said base output chamber, said first and second ports comprising openings through substantially opposite sides of said cap;
   a filter material in said housing;
   a tube connected on one end to said housing first port and open on its other end adjacent to the top end of said housing whereby water from said input chamber is carried through said tube to the top end of said housing and then passes down through said filter material to said output chamber through said second port; and a plurality of vanes between said cap and said filter material for directing water toward said second port.

2. The shower filter of claim 1, further comprising a top diffuser in said housing between said housing top end and said filter material, wherein said tube extends through said diffuser.

3. The shower filter of claim 2, wherein said top diffuser includes a screen.

4. The shower filter of claim 3, further comprising a bottom diffuser at a cap at the bottom of said housing.

5. The shower filter of claim 1, further comprising a twist connection between said housing and said base whereby said housing may be released from said base by twisting the housing relative to said base.

6. The shower filter of claim 1, wherein said base comprises:
 a first section with said base input and said base output and defining a generally upwardly open first part of the input chamber and a generally upwardly open first part of the output chamber;
 a second section defining a generally downwardly open second part of the input chamber and a generally downwardly open second part of the output chamber, wherein said second section includes
  an outlet opening from said input chamber communicating with said housing first port, and
  an inlet opening to said output chamber communicating with said housing second port;
 wherein said base first and second sections are sealed together so that passage of water directly between the input and output chambers is prevented.

7. The shower filter of claim 6, wherein said first port is aligned with said input chamber outlet opening and said second port is aligned with said output chamber inlet opening.

8. The shower filter of claim 7, wherein said vanes are on an upper side of said cap facing said housing top end.

9. The shower filter of claim 8, wherein said filter material comprises vertically discrete sections of at least two of felt, foam and carbon.

10. The shower filter of claim 9, wherein said filter sections include aligned holes through which said tube extends.

11. The shower filter of claim 10, wherein the filter section adjacent the housing cap comprises infrared ceramic balls.

12. The shower filter of claim 11, wherein said vanes extend upwardly from said cap and said ceramic ball filter section sits atop said vanes.

13. The shower filter of claim 9, wherein said cap is fixed to said housing and seals said filter material in said housing.

14. The shower filter of claim 7, further comprising a twist connection between said housing and said base whereby said housing may be released from said base by twisting the housing relative to said base.

15. The shower filter of claim 14, wherein said housing is generally cylindrical along its height but further including flat portions on opposite sides of said housing above said twist connection.

16. The shower filter of claim 1, further comprising a mount on said base adjacent the base output, and a removable fragrant insert secured to said mount.

17. A shower filter for connection between a downwardly slanting shower arm and a shower head comprising:
 a base having
  an input with an input connector securable to said shower arm and defining an input chamber for receiving water from said shower arm, and
  an output with an output connector securable to said shower head and defining an output chamber for discharging water to said shower head,
  wherein said base includes
   a first section with said base input and said base output and defining a generally upwardly open first part of the input chamber and a generally upwardly open first part of the output chamber,
   a second section defining a generally downwardly open second part of the input chamber and a generally downwardly open second part of the output chamber, wherein said second section includes
    an outlet opening from said input chamber communicating with a housing first port, and
    an inlet opening to said output chamber communicating with a housing second port,
    wherein said base first and second sections are sealed together so that passage of water directly between the input and output chambers is prevented;
 a generally vertical housing having a cap closing its bottom end, said housing secured at its bottom end to said base, having the first and second ports through said cap, said first port communicating with said base input chamber and said second port communicating with said base output chamber;
 a filter in said housing, including
  a filter material in said housing, said filter material including vertically discrete sections of at least three of felt, foam, carbon, and infrared ceramic balls,
  a top diffuser in said housing between said housing top end and said filter material, and
  a bottom diffuser at the cap at the bottom of said housing; and
 a tube connected on one end to said housing first port and open on its other end adjacent to the top end of said housing, said tube extending through said top filter material and top diffuser whereby water from said input chamber is carried through said tube to the top end of said housing and then passes down through said filter material to said output chamber through said second port;
 wherein said cap on its upper side facing said housing top end includes vanes for directing water toward said second port.

18. The shower filter of claim 17, further comprising a lip extending from said cap upper side to define a boundary of a housing exit chamber around said vanes and said second port, wherein said bottom diffuser is a screen overlying said lip and vanes and defining an upper side of said housing exit chamber.

19. The shower filter of claim 17, further comprising a twist connection between said housing and said base whereby said housing may be released from said base by twisting the housing relative to said base.

20. The shower filter of claim 17, further comprising a mount on said base adjacent the base output, and a removable fragrant insert secured to said mount.

21. A shower head accessory for connection between a shower arm and a shower head, comprising:
 a housing with an input for water from a shower arm and an output for water at a shower head, said housing having water filters therein wherein water from said input is directed through said water filters before leaving said exit to the shower head;

a mount on the exterior of the housing adjacent the housing exit; and a removable fragrant insert secured to said mount.

22. The shower head accessory of claim 21, wherein said mount includes an opening aligned with vents on said fragrant insert on a side facing away from said housing.

23. The shower head accessory of claim 22, further comprising a hook on said mount adjacent said vents.

* * * * *